US012646471B2

(12) United States Patent
Lee et al.

(10) Patent No.: US 12,646,471 B2
(45) Date of Patent: Jun. 2, 2026

(54) DISPLAY DEVICE

(71) Applicant: LG Display Co., Ltd., Seoul (KR)

(72) Inventors: Jae Young Lee, Paju-si (KR); Dongju Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/902,425

(22) Filed: Sep. 30, 2024

(65) Prior Publication Data

US 2025/0118269 A1 Apr. 10, 2025

(30) Foreign Application Priority Data

Oct. 4, 2023 (KR) ........................ 10-2023-0131391

(51) Int. Cl.

*G09G 3/3291* (2016.01)
*G09G 3/3275* (2016.01)
*H10K 59/131* (2023.01)

(52) U.S. Cl.

CPC ... *G09G 3/3291* (2013.01); *G09G 2300/0426* (2013.01); *G09G 2310/08* (2013.01); *G09G 2330/023* (2013.01); *G09G 2330/045* (2013.01)

(58) Field of Classification Search

CPC .................................................... G02F 1/13452
See application file for complete search history.

(56) References Cited

U.S. PATENT DOCUMENTS 8,736,801 B2 * 5/2014 Kim .................. G02F 1/133308 349/151
9,035,931 B2 * 5/2015 Seo ...................... G09G 3/3655 345/87
9,237,628 B2 * 1/2016 Shin .................... H10K 59/1315
10,088,721 B2 * 10/2018 Ha .................... G02F 1/136204
12,217,681 B2 * 2/2025 Kim ...................... G09G 3/3233
2002/0158859 A1 * 10/2002 Nakano ................ G09G 3/3696 345/204
2004/0017535 A1 * 1/2004 Ko ........................ G02F 1/1345 349/150
2005/0212735 A1 * 9/2005 Lin ...................... G09G 3/3655 345/87
2008/0068313 A1 * 3/2008 Jang ....................... H05K 1/148 345/87
2008/0266506 A1 * 10/2008 Takenaka ............. G09G 3/3611 349/149
2009/0040166 A1 * 2/2009 Lee ....................... G02F 1/1345 345/98
2014/0139413 A1 * 5/2014 Kwon .................... H10K 59/88 345/82
2015/0070616 A1 * 3/2015 Ogasawara .......... H10K 59/131 349/43
2015/0179106 A1 * 6/2015 Yoon .................... G09G 3/3233 345/77
2016/0117988 A1 * 4/2016 Lee ...................... G09G 3/3233 345/82

(Continued)

*Primary Examiner* — Sepehr Azari
(74) *Attorney, Agent, or Firm* — Fenwick & West LLP

(57) ABSTRACT

A display device is disclosed that comprises a display panel including a plurality of subpixels, a source film coupled to a side of the display panel and on which a source driving integrated circuit supplying a data voltage to the display panel is implemented, and a source printed circuit board on which a low-potential voltage line transmitting a base voltage to the display panel through the source film is disposed in a closed loop structure.

15 Claims, 14 Drawing Sheets

(56) References Cited

U.S. PATENT DOCUMENTS

| | | | | |
|---|---|---|---|---|
| 2016/0147105 | A1* | 5/2016 | Ha | G02B 6/00 445/24 |
| 2018/0090547 | A1* | 3/2018 | Shin | H10K 59/8722 |
| 2020/0154572 | A1* | 5/2020 | Choi | H05K 1/189 |
| 2020/0312206 | A1* | 10/2020 | Eom | G09G 3/3611 |
| 2021/0158769 | A1* | 5/2021 | Choi | G09G 3/3655 |
| 2021/0364870 | A1* | 11/2021 | Chen | H05K 1/0259 |
| 2024/0078947 | A1* | 3/2024 | Koh | G09G 3/20 |

* cited by examiner

DISPLAY DEVICE

CROSS-REFERENCE TO RELATED APPLICATION

This application claims priority from Republic of Korea Patent Application No. 10-2023-0131391, filed on Oct. 4, 2023, which is hereby incorporated by reference in its entirety.

BACKGROUND

Field

Embodiments of the disclosure relate to a display device and more specifically, a display device capable of reducing an amount of heat generated in a display panel by forming a low-potential voltage line disposed on a source printed circuit board in a closed loop structure.

Description of Related Art

With the development of the information society, various needs for display devices that display images are increasing, and various types of display devices, such as liquid crystal displays (LCDs), organic light emitting displays (OLEDs), etc. are being utilized.

Among these display devices, the organic light emitting display device uses self-emissive organic light emitting diodes, providing advantages, such as a fast response and better contrast ratio, luminous efficiency, luminance, and viewing angle.

The organic light emitting display device may include organic light emitting diodes respectively arranged in a plurality of subpixels disposed on a display panel and cause the organic light emitting diodes to emit light by controlling the current flowing to the organic light emitting diodes, thereby displaying images while controlling the luminance of each subpixel.

As these display devices display higher luminance, higher current is supplied to the display panel through low-potential voltage lines. This may cause a problem of increased heat generation of the display panel.

SUMMARY

Accordingly, the inventors of the disclosure have invented a display device capable of reducing an amount of heat generated in a display panel.

Embodiments of the disclosure may provide a display device capable of reducing an amount of heat generated in a display panel and operating at low power by forming a low-potential voltage line disposed on a source printed circuit board in a closed loop structure.

Embodiments of the disclosure provide a display device comprising: a display panel including a plurality of subpixels; a source film connected to a side of the display panel; a source driving integrated circuit on the source film, the source driving integrated circuit configured to supply a data voltage to the display panel; a source printed circuit board connected to the source film; and a low-potential voltage line on the source printed circuit board and having a closed loop structure in a plan view of the display device, the low-potential voltage line supplying a base voltage to the display panel through the source film.

In one embodiment, a display device comprises: a display panel including a plurality of subpixels; a plurality of source films each having a first side and a second side, the first side of each of the plurality of source films connected to the display panel; a plurality of source driving integrated circuits that are configured to supply data voltages to the display panel, each source driving integrated circuit on a corresponding one of the plurality of source films; a source printed circuit board connected to the second side of each of the plurality of source films; and a voltage line on the source printed circuit board that supplies a voltage to the display panel, the voltage line including a first voltage line having a first end and a second end, a second voltage line that is farther from the display panel than the first voltage line and having a first end and a second end, and a third voltage line connected to the first end of the first voltage line and the first end of the second voltage line, and a fourth voltage line connected to the second end of the first voltage line and the second end of the second voltage line.

According to embodiments of the disclosure, it is possible to reduce an amount of heat generated in a display panel.

According to embodiments of the disclosure, it is possible to reduce an amount of heat generated in a display panel and operate at low power by forming a low-potential voltage line disposed on a source printed circuit board in a closed loop structure.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
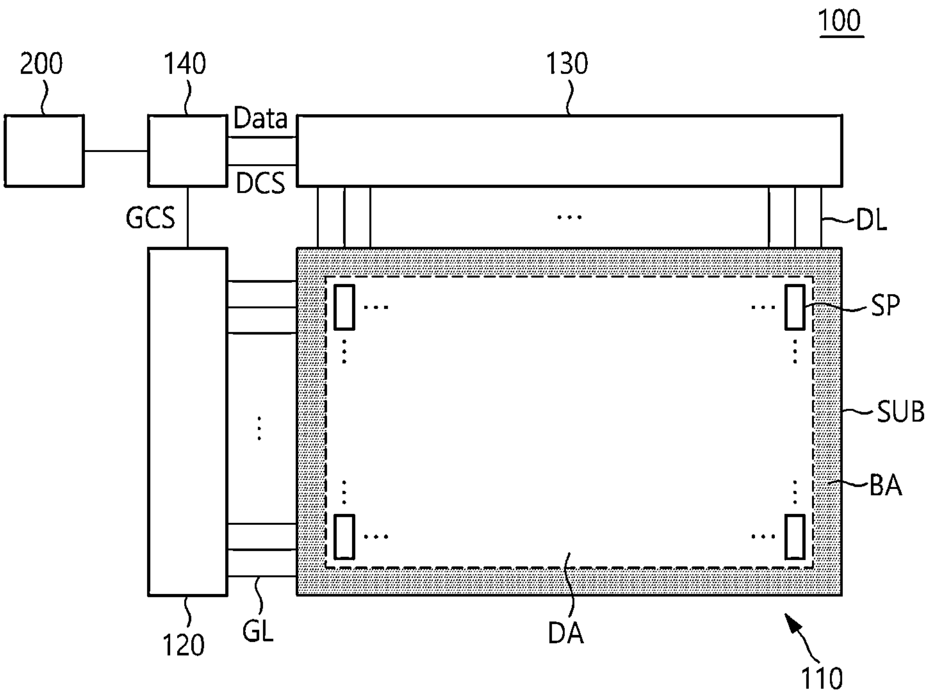
FIG. 1 is a view schematically illustrating a display device according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a view schematically illustrating a display device according to embodiments of the disclosure.

Referring to FIG. 1, a display device 100 according to embodiments of the disclosure may include a display panel 110 and a driving circuit for driving the display panel 110.

The display panel 110 may include a display area DA in which images are displayed and a bezel area BA in which no image is displayed. The bezel area BA may also be referred to as a non-display area and may surround the display area DA.

The display panel 110 may include a plurality of subpixels SP for displaying images. For example, a plurality of subpixels SP may be disposed in the display area DA. In some cases, at least one subpixel SP may be disposed in the bezel area BA. At least one subpixel SP may be disposed in the bezel area BA and is referred to as a dummy subpixel.

The display panel 110 may include a plurality of signal lines for driving a plurality of subpixels SP. For example, the plurality of signal lines may include a plurality of data lines DL and a plurality of gate lines GL. The signal lines may further include other signal lines than the plurality of data lines DL and the plurality of gate lines GL according to the structure of the subpixel SP. For example, the other signal lines may include driving voltage lines and reference voltage lines.

The plurality of data lines DL and the plurality of gate lines GL may cross each other. Each of the plurality of data lines DL may be disposed while extending in a first direction. Each of the plurality of gate lines GL may be disposed while extending in a second direction. Here, the first direction may be a column direction and the second direction may be a row direction. In the disclosure, the column direction and the row direction are relative. For example, the column direction may be a vertical direction and the row direction may be a horizontal direction. As another example, the column direction may be a horizontal direction and the row direction may be a vertical direction.

The driving circuit may include a data driving circuit 130 for driving a plurality of data lines DL and a gate driving circuit 120 for driving a plurality of gate lines GL. The driving circuit may further include a timing controller 140 for controlling the data driving circuit 130 and the gate driving circuit 120.

The data driving circuit 130 is a circuit for driving the plurality of data lines DL, and may output data signals (also referred to as data voltages) corresponding to image signals to the plurality of data lines DL. The gate driving circuit 120 is a circuit for driving the plurality of gate lines GL and may generate gate signals, and output the gate signals to the plurality of gate lines GL. The gate signal may include one or more scan signals and light emission signals.

The timing controller 140 may start a scan according to the timing implemented in each frame and may control data driving at an appropriate time according to the scan. The timing controller 140 may convert input image data input from the outside to suit the data signal format used by the data driving circuit 130 and supply the converted image data DATA to the data driving circuit 130.

The timing controller 140 may receive display driving control signals, along with input image data, from an external host system 200. For example, the display driving control signals may include a vertical synchronizing signal, a horizontal synchronizing signal, an input data enable signal, and a clock signal.

The timing controller 140 may generate the data driving control signal DCS and the gate driving control signal GCS based on display driving control signals input from the host system 200. The timing controller 140 may control the driving operation and driving timing of the data driving circuit 130 by supplying the data driving control signal DCS to the data driving circuit 130. The timing controller 140 may control the driving operation and driving timing of the gate driving circuit 120 by supplying the gate driving control signal GCS to the gate driving circuit 120.

Figure 2:
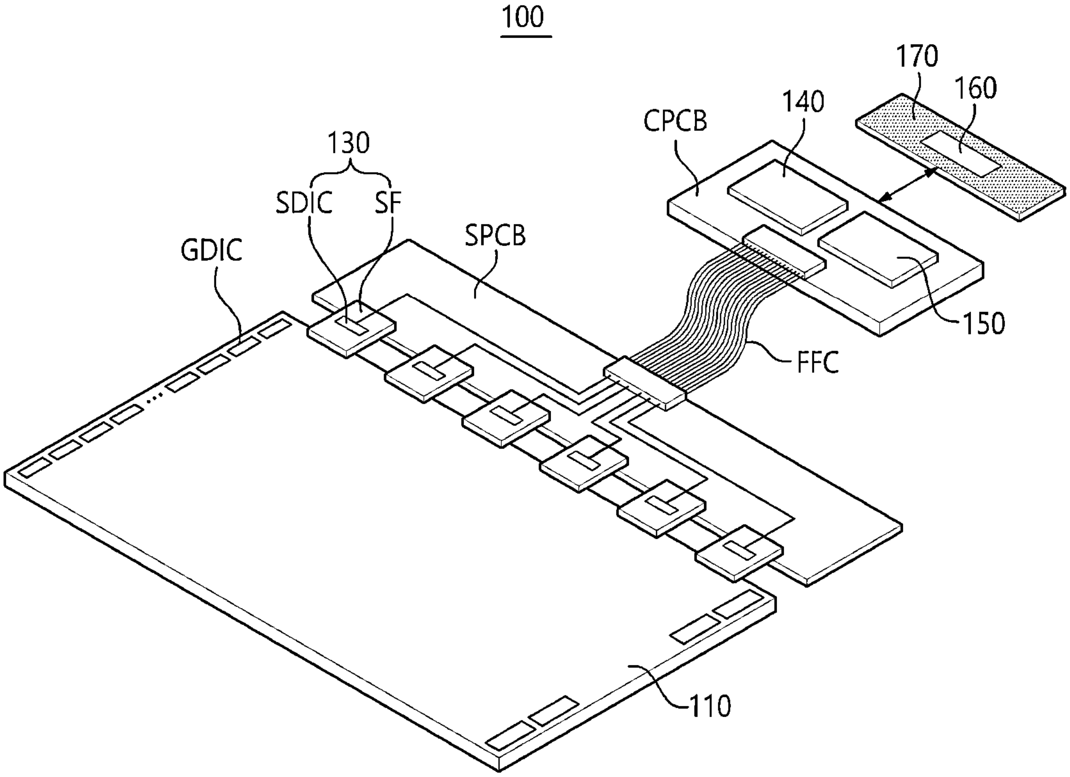
FIG. 2 is a system example view illustrating a display device according to embodiments of the disclosure.

The data driving circuit 130 may include one or more source driving integrated circuits SDIC (referring to FIG. 2). Each source driving integrated circuit may include a shift register, a latch circuit, a digital to analog converter (DAC), an output buffer, and the like. In some cases, each source driving integrated circuit may further include an analog to digital converter (ADC).

For example, each source driving integrated circuit may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 120 may output a gate signal of a turn-on level voltage or a gate signal of a turn-off level voltage according to the control of the timing controller 140. The gate driving circuit 120 may sequentially drive the plurality of gate lines GL by sequentially supplying gate signals of the turn-on level voltage to the plurality of gate lines GL.

The gate driving circuit 120 may include one or more gate driving integrated circuits GDIC (referring to FIG. 2).

The gate driving circuit 120 may be connected with the display panel 110 by TAB method or connected to a bonding pad of the display panel 110 by a COG or COP method or may be connected with the display panel 110 according to a COF method. Alternatively, the gate driving circuit 120 may be formed, in a gate in panel (GIP) type, in the bezel area BA of the display panel 110. The gate driving circuit 120 may be disposed on the substrate or may be connected to the substrate. In other words, the gate driving circuit 120 that is of a GIP type may be disposed in the bezel area BA of the substrate. The gate driving circuit 120 that is of a chip-on-glass (COG) type or chip-on-film (COF) type may be connected to the substrate.

Meanwhile, at least one of the data driving circuit 130 and the gate driving circuit 120 may be disposed in the display area DA. For example, at least one of the data driving circuit 130 and the gate driving circuit 120 may be disposed not to overlap the subpixels SP or to overlap all or some of the subpixels SP.

The data driving circuit 130 may be connected to one side (e.g., an upper or lower side) of the display panel 110. Depending on the driving scheme or the panel design scheme, the data driving circuit 130 may be connected with both sides (e.g., upper and lower sides) of the self-emission display panel 110, or two or more of the four sides of the self-emission display panel 110.

The gate driving circuit 120 may be connected with one side (e.g., a left or right side) of the display panel 110. Depending on the driving scheme or the panel design scheme, the gate driving circuit 120 may be connected with both sides (e.g., left and right sides) of the display panel 110, or two or more of the four sides of the display panel 110.

The timing controller 140 may be implemented as a separate component from the data driving circuit 130, or the timing controller 140 and the data driving circuit 130 may be integrated into an integrated circuit (IC). The timing controller 140 may be a controller used in typical display technology or a control device that may perform other control functions as well as the functions of the timing controller, or a circuit in the control device. The timing controller 140 may be implemented as various circuits or electronic components, such as an integrated circuit (IC), a field programmable gate array (FPGA), an application specific integrated circuit (ASIC), or a processor.

The timing controller 140 may be mounted on a printed circuit board or a flexible printed circuit and may be electrically connected with the data driving circuit 130 and the gate driving circuit 120 through the printed circuit board or the flexible printed circuit. The timing controller 140 may transmit/receive signals to/from the data driving circuit 130 according to one or more predetermined interfaces. The interface may include, e.g., a low voltage differential signaling (LVDS) interface, an EPI interface, and a serial peripheral interface (SP).

The display device 100 according to embodiments of the disclosure may be a self-emissive display device in which the display panel 110 emits light by itself. When the display device 100 according to the embodiments of the disclosure is a self-emissive display device, each of the plurality of subpixels SP may include a light emitting element. For example, the display device 100 according to embodiments of the disclosure may be an organic light emitting diode display in which the light emitting element is implemented as an organic light emitting diode (OLED). As another example, the display device 100 according to embodiments of the disclosure may be an inorganic light emitting display device in which the light emitting element is implemented as an inorganic material-based light emitting diode. As another example, the display device 100 according to embodiments of the disclosure may be a quantum dot display device in which the light emitting element is implemented as a quantum dot which is self-emission semiconductor crystal.

FIG. 2 is a system example view illustrating a display device according to embodiments of the disclosure.

FIG. 2 illustrates an example in which in the display device 100 according to embodiments of the disclosure, the data driving circuit 130 is implemented by a chip on film (COF) type among various types (e.g., TAB, COG, and COF), and the gate driving circuit 120 is implemented by a gate in panel (GIP) type among various types (e.g., TAB, COG, COF, and GIP).

When the gate driving circuit 120 is implemented in the GIP type, the plurality of gate driving integrated circuits GDIC included in the gate driving circuit 120 may be directly formed in the bezel area of the display panel 110. In this case, the gate driving integrated circuits GDIC may receive various signals (e.g., a clock, a gate high signal, a gate low signal, etc.) necessary for generating scan signals through gate driving-related signal lines disposed in the bezel area.

Likewise, one or more source driving integrated circuits SDIC included in the data driving circuit 130 each may be mounted on the source film SF, and a first side of the source film SF may be electrically connected to a side of the display panel 110. Lines for electrically connecting the source driver integrated circuit SDIC and the display panel 110 may be disposed on the source film SF. In one embodiment, the display device 100 includes a plurality of source films SF as shown in FIG. 2 and a corresponding one of the source driving integrated circuits SDIC is mounted on each of the source films SF.

The display device 100 may include at least one source printed circuit board SPCB for circuit connection between a plurality of source driving integrated circuits SDIC and other devices and a control printed circuit board CPCB for mounting control components and various electric devices.

The second side of the source film SF where the source driving integrated circuit SDIC is disposed may be connected to at least one source printed circuit board SPCB. In other words, a first side of the source film SF where the source driving integrated circuit SDIC is mounted may be electrically connected with the display panel 110, and the second side of the source film SF may be electrically connected with the source printed circuit board SPCB.

The timing controller 140 and the power management circuit 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. The at least one source printed circuit board SPCB and control printed circuit board CPCB may be integrated into a single printed circuit board.

The display device 100 may further include a set board 170 electrically connected to the control printed circuit board CPCB. In this case, the set board 170 may also be referred to as a power board. A main power management circuit 160 for managing the overall power of the display device 100 may be present on the set board 170. The main power management circuit 160 may interwork with the power management circuit 150.

In the so-configured display device 100, the driving voltage is generated in the set board 170 and transferred to the power management circuit 150 in the control printed circuit board CPCB. The power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include a light emitting element and a circuit element, e.g., a driving transistor, for driving the organic light emitting diode.

The type and number of circuit elements constituting each subpixel SP may be varied depending on functions to be provided and design schemes.

Figure 3:
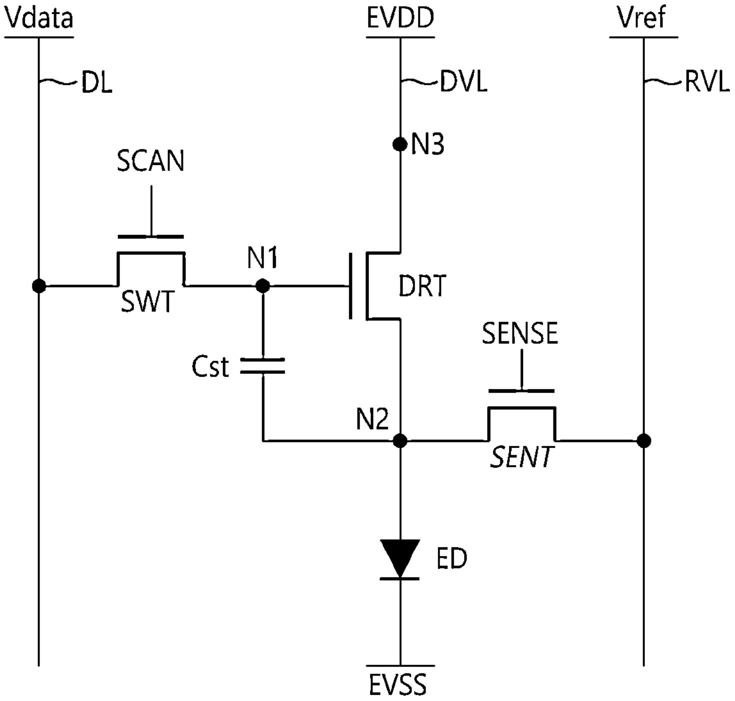
FIG. 3 is a view illustrating an example of a circuit constituting a subpixel in a display device according to embodiments of the disclosure.

FIG. 3 is a view illustrating an example of a circuit constituting a subpixel in a display device according to embodiments of the disclosure.

Referring to FIG. 3, in the display device 100 according to embodiments of the disclosure, the subpixel SP may include one or more transistors and a capacitor and an organic light emitting diode (OLED) as a light emitting element ED.

For example, the subpixel SP may include a driving transistor DRT, a switching transistor SWT, a sensing transistor SENT, a storage capacitor Cst, and a light emitting element ED.

The driving transistor DRT includes the first node N1, second node N2, and third node N3. The first node N1 of the driving transistor DRT may be a gate node to which the data voltage Vdata is supplied from the data driving circuit 130 through the data line DL when the switching transistor SWT is turned on. The second node N2 of the driving transistor DRT may be electrically connected with the anode electrode of the light emitting element ED and may be the source node or drain node. The third node N3 of the driving transistor DRT may be electrically connected to a high-potential voltage line DVL supplying a high-potential subpixel driving voltage EVDD that is greater than the low-potential base voltage EVSS and may be the drain node or the source node.

In this case, during a display driving period, a subpixel driving voltage EVDD necessary for displaying an image may be supplied to the driving voltage line DVL. For example, the subpixel driving voltage EVDD necessary for displaying an image may be 27 V.

The switching transistor SWT is electrically connected between the first node N1 of the driving transistor DRT and the data line DL, and the gate line GL is connected to the gate node. Thus, the switching transistor SWT is operated according to the scan signal SCAN supplied through the gate line GL. When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the sense signal SENSE supplied through the gate line GL. When the sensing transistor SENT is turned on, a sensing reference voltage Vref supplied through the reference voltage line RVL is transferred to the second node N2 of the driving transistor DRT.

In other words, as the switching transistor SWT and the sensing transistor SENT are controlled, the voltage of the first node N1 and the voltage of the second node N2 of the driving transistor DRT are controlled, so that the current for driving the light emitting element ED may be supplied.

The gate nodes of the switching transistor SWT and the sensing transistor SENT may be commonly connected to one gate line GL or may be connected to different gate lines GL. An example is shown in which the switching transistor SWT and the sensing transistor SENT are connected to different gate lines GL in which case the switching transistor SWT and the sensing transistor SENT may be independently controlled by the scan signal SCAN and the sense signal SENSE transferred through different gate lines GL.

In contrast, if the switching transistor SWT and the sensing transistor SENT are connected to one gate line GL, the switching transistor SWT and the sensing transistor SENT may be simultaneously controlled by the scan signal SCAN or sense signal SENSE transferred through one gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting element ED may be electrically connected with the second node N2 of the driving transistor DRT, and a low-potential base voltage EVSS may be supplied to the cathode electrode of the light emitting element ED.

The base voltage EVSS may be a ground voltage or a voltage greater or less than the ground voltage. The base voltage EVSS may vary depending on the driving state. For example, the base voltage EVSS at the time of display driving and the base voltage EVSS at the time of sensing driving may be set to differ from each other.

The structure of the subpixel SP described above as an example is a 3T (transistor) 1C (capacitor) structure, which is merely an example for description, and may further include one or more transistors or, in some cases, one or more capacitors. The plurality of subpixels SP may have the same structure, or some of the plurality of subpixels SP may have a different structure.

Figure 4:
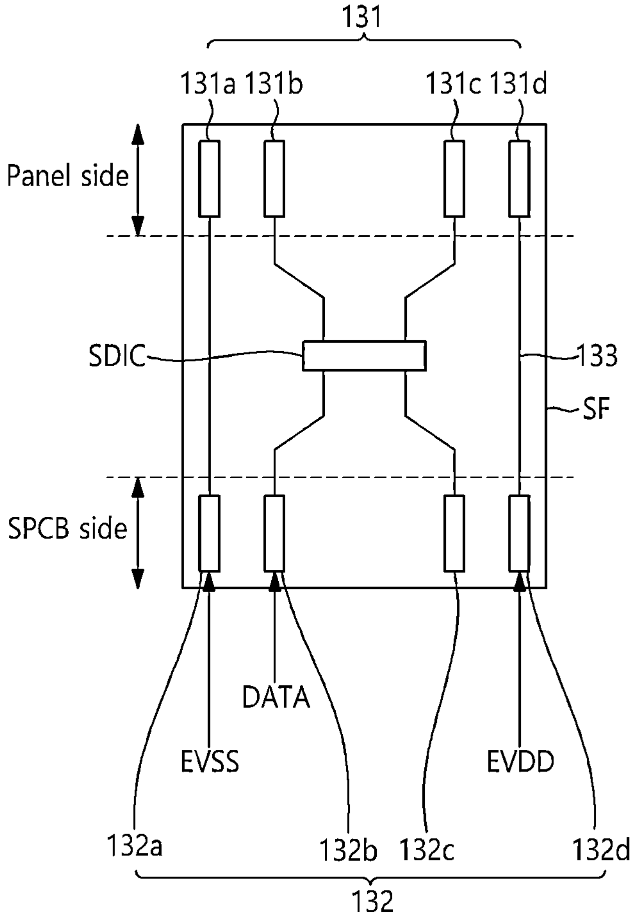
FIG. 4 is a diagram specifically illustrating the source film connecting the source printed circuit board to the display panel in the display device according to embodiments of the disclosure.

FIG. 4 is a diagram specifically illustrating the source film SF connecting the source printed circuit board SPCB to the display panel 110 in the display device according to embodiments of the disclosure.

Referring to FIG. 4, the source driving integrated circuit SDIC may be implemented on the source film SF connecting the source printed circuit board SPCB to the display panel 110 in the display device 100 according to embodiments of the disclosure.

The source driving integrated circuit SDIC may be disposed in type of chip-on-film COF on the source film SF.

The source film SF may include one or more first pins 131 connected to the display panel 110.

The one or more first pins 131 may include first data pins 131*b*, 131*c* for supplying the data voltage Vdata generated in the source driving integrated circuit SDIC to the display panel 110 and first driving pins 131*a*, 131*d* for supplying the driving voltages.

The driving voltages supplied to the display panel 110 through the first driving pins 131*a*, 131*d* may be a low-potential base voltage EVSS or a high-potential subpixel driving voltage EVDD.

Additionally, the source film SF may include one or more second pins 132 connected to the source printed circuit board SPCB.

One or more second pins 132 may include second data pins 132*b*, 132*c* receiving image data DATA supplied from the timing controller 140 and second driving pins 132*a*, 132*d* receiving driving voltages supplied from the power management circuit 150.

The image data DATA supplied through the second data pins 132*b*, 132*c* may be converted into an analog data voltage Vdata in the source driving integrated circuit SDIC and transmitted through the first data pins 131*b*, 131*c*.

The driving voltages EVDD, EVSS supplied through the second driving pins 132*a*, 132*d* may be transmitted to the first driving pins 131*a*, 131*d* through a connection line 133.

At this time, since a high current flows in a voltage line transmitting the low-potential base voltage EVSS in the source printed circuit board SPCB of the display panel 110 that emits light at high luminance, the amount of heat in the source printed circuit board SPCB increases.

In particular, because the source printed circuit board SPCB is in direct contact with the display panel 110 through the source film SF, it causes a rise of temperature in the display panel 110.

The display device 100 of the disclosure may secure a transmission path for base voltage and reduce an amount of heat generated in the display panel 110 by disposing a low-potential voltage line on the source printed circuit board SPCB in a closed loop structure.

Figure 5:
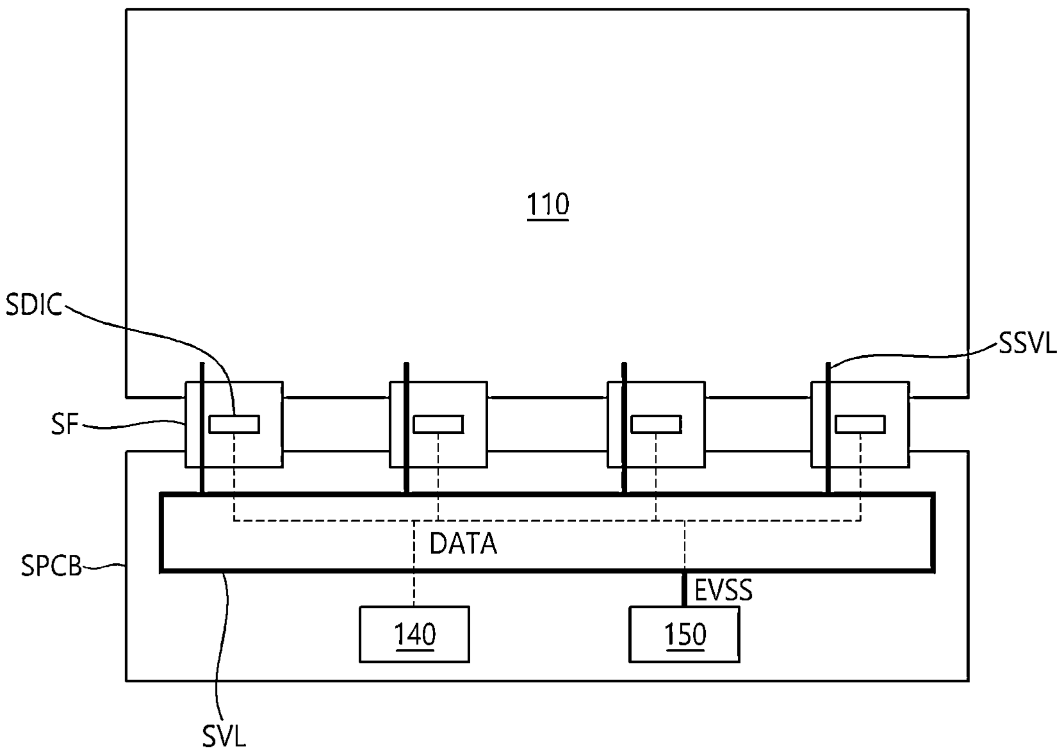
FIG. 5 is a diagram illustrating a structure of a low-potential voltage line formed on a source printed circuit board in a display device according to embodiments of the disclosure.

FIG. 5 is a diagram illustrating a structure of a low-potential voltage line formed on a source printed circuit board SPCB in a display device according to embodiments of the disclosure.

Referring to FIG. 5, one or more source driving integrated circuit SDIC included in the data driving circuit 130 may be implemented in the form of a chip on film COF on the source film SF in the display device 100 according to embodiments of the disclosure.

One side of the source film SF may be electrically connected to the display panel 110, and the other side of the source film SF may be electrically connected to the source printed circuit board SPCB.

The timing controller 140 and the power management circuit 150 may be implemented on the control printed circuit board CPCB.

The timing controller 140 may supply image data DATA to the source driving integrated circuit SDIC disposed on the source film SF.

The power management circuit 150 may supply a high-potential subpixel driving voltage EVDD and a low-potential base voltage EVSS for driving the display panel 110. Here, it illustrates only the low-potential voltage line SVL for supplying the low-potential base voltage EVSS.

At this time, the low-potential voltage line SVL (e.g., a voltage line) transmitting the base voltage EVSS may be formed in a closed loop structure on the source printed circuit board SPCB. That is, the low-potential voltage line SVL is not formed in an open structure extending in a curved straight line from the power management circuit 150 to the source film SF, but is formed in a shape of closed loop like a square structure between the power management circuit 150 and the source film SF in a plan view.

In this way, when the low-potential voltage line SVL is formed in a closed loop structure on the source printed circuit board SPCB, the path of the base voltage EVSS transmitted through the low-potential voltage line SVL may increase. As a result, the temperature of the low-potential voltage line SVL may be reduced because the heat generated by the base voltage EVSS spreads over a wide area.

In one embodiment, a plurality of low-potential connection lines SSVL extend from points of the low-potential voltage line SVL with the closed loop structure and may be disposed along the side of the source film SF. In one embodiment, the plurality of low-potential connection lines SSVL extend from the low-potential voltage line SVL to the display panel 110 such that each low-potential connection line SSVL overlaps a corresponding source film SF from the plurality of source films SF without overlapping the source driving integrated circuit SDIC that is on the corresponding source film SF. An end of each low-potential connection line SSVL is electrically connected to the display panel 110.

Each low-potential connection line SSVL may be disposed on a corresponding source film SF and may extend along the side of the source driving integrated circuit SDIC on the source film SF.

At this time, an amount of heat is reduced more effectively by varying the width of the low-potential voltage line SVL with a closed loop structure formed on the source printed circuit board SPCB depending on a distance from the display panel 110.

Figure 6:
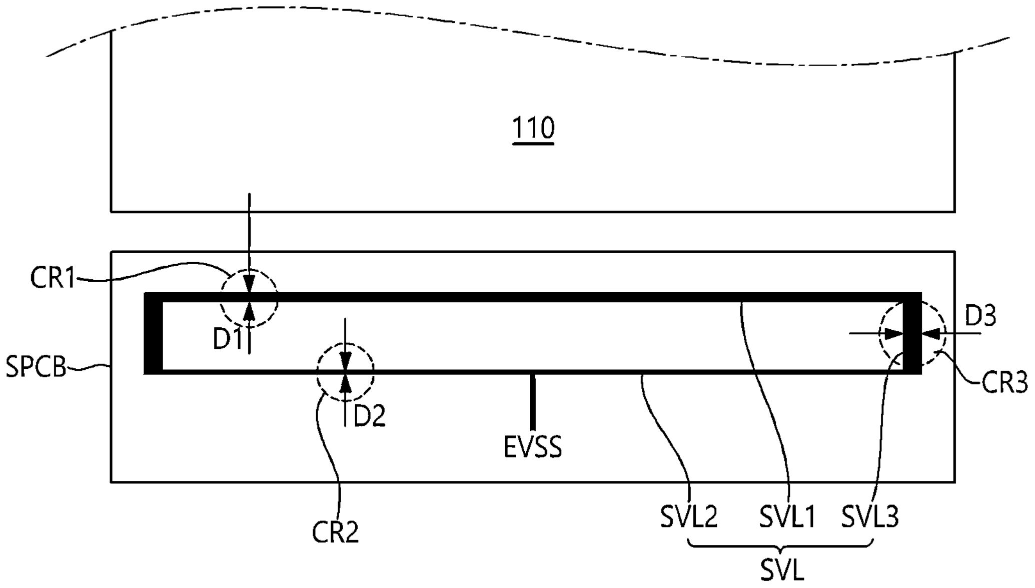
FIG. 6 is a diagram illustrating a structure in which the width of a low-potential voltage line is varied depending on the location in a display device according to embodiments of the disclosure.

FIG. 6 is a diagram illustrating a structure in which the width of a low-potential voltage line is varied depending on the location in a display device according to embodiments of the disclosure.

Referring to FIG. 6, the low-potential voltage lines SVL formed in a closed loop structure on the source printed circuit board SPCB in the display device 100 according to embodiments of the disclosure may be composed of a first low-potential voltage line SVL1 (e.g., a first voltage line), a second low-potential voltage line SVL2 (e.g., a second voltage line) that is spaced apart from the first low-potential voltage line SVL1, and a pair of third low-potential voltage lines SVL3 (e.g., a third voltage line and a fourth voltage line).

The first low-potential voltage line SVL1 may be located in the first area CR1 adjacent to the display panel 110. The first area CR1 may extend along the long axis of the display panel 110 and may be an area adjacent to the display panel 110.

The second low-potential voltage line SVL2 may be located in the second area CR2 that is farther from the display panel 110 than the first area CR1. The second area CR2 may extend along the long axis of the display panel 110 and may be an area farther away from the display panel 110 than the first area CR1.

The third low-potential voltage lines SVL3 may be a portion connecting the first low-potential voltage line SVL1 and the second low-potential voltage line SVL2 in a third area CR3. The third area CR3 may be an area extending in a direction that intersects (e.g., perpendicular) to the long axis of the display panel 110 on the left and right sides of the source printed circuit board SPCB.

In one embodiment, a first end of the first low-potential voltage line SVL1 (e.g., a left end) is connected to a first end of a first one of the third low-potential voltage lines SVL3 and a second end of the first low-potential voltage line SVL1 is connected to a first end of a second one of the third low-potential voltage lines SVL3. A first end of the second low-potential voltage line SVL2 is connected to a second end of the first one of the third low-potential voltage lines SVL3 and a second end of the second low-potential voltage lines SVL2 is connected to a second end of the second one of the third low-potential voltage lines SVL3 thereby forming the closed loop shape.

At this time, the width of the low-potential voltage line SVL formed in a closed loop structure on the source printed circuit board SPCB to transmit the low-potential base voltage EVSS may vary depending on the locations.

The heat generated by the base voltage EVSS flowing through the low-potential voltage line SVL may increase the temperature of the display panel 110. Therefore, in order to reduce the temperature rise of the display panel 110, the first width D1 of the first low-potential voltage line SVL1 located in the first area CR1 adjacent to the display panel 110 may be greater than the second width D2 of the second low-potential voltage line SVL2 located in the second area CR2 far from the display panel 110. The third width D3 of the third low-potential voltage line SVL3 is greater than the first width D1 of the first low-potential voltage line SVL1.

At this time, the sum of the first width D1 of the first low-potential voltage line SVL1 located in the first area CR1 adjacent to the display panel 110 and the second width D2 of the second low-potential voltage line SVL2 located in the second area CR2 far from the display panel 110 the second width D2 of the second low-potential voltage line SVL2 located in the second area CR2 far from the display panel 110 may be maintained to be a constant reference value D, that is, D1+D2=D.

The reference value D of the low-potential voltage line SVL may correspond to the width when the low-potential voltage line SVL is formed in an open structure.

For example, when the low-potential voltage line SVL between the power management circuit 150 and the source film SF is formed in an open structure with a stepped straight line, the reference value D of the low-potential voltage line SVL may be 10 mm. At this time, the low-potential voltage line SVL with the closed loop structure may be formed to have a reference value 10 mm corresponding to a sum of the first width D1 of the first low-potential voltage line SVL1 located in the first area CR1 and the second width D2 of the second low-potential voltage line SVL2 located in the second area CR2.

At this time, the first width D1 of the first low-potential voltage line SVL1 located in the first area CR1 adjacent to the display panel 110 may be greater than the second width D2 of the second low-potential voltage line SVL2 located in the second area CR2 far from the display panel 110.

At this time, the first width D1 of the first low-potential voltage line SVL1 and the second width D2 of the second low-potential voltage line SVL2 may be determined through experiments in the display device 100 with the same specification.

FIGS. 7A to 7D are experimental graphs illustrating signal characteristics according to the width of a low-potential voltage line in a display device according to embodiments of the disclosure.

Referring to FIGS. 7A to 7D, the display device 100 according to embodiments of the disclosure may be judged based on the signal characteristics of IPC-2221, which represents the international standard for assembly and production standards of an electronic equipment and device components.

Specifically, temperature, current density, current, and power density may be detected as signal characteristics of the low-potential voltage line SVL.

Figure 7A:
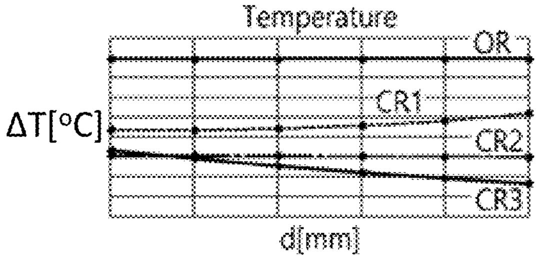
FIGS. 7A to 7D are experimental graphs illustrating signal characteristics according to the width of a low-potential voltage line in a display device according to embodiments of the disclosure.
Figure 7B:
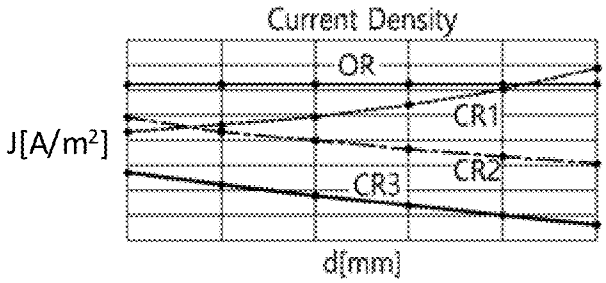
Figure 7C:
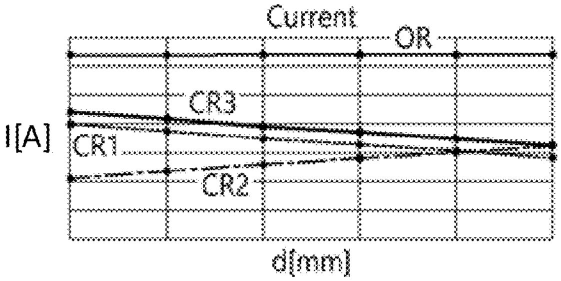
Figure 7D:
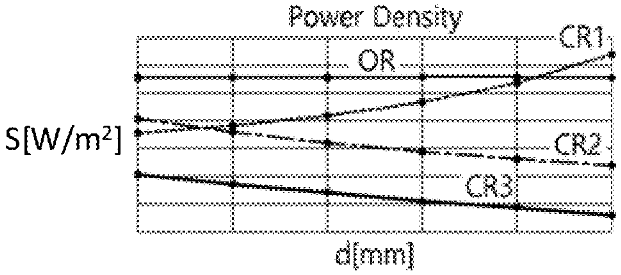

FIG. 7A illustrates a temperature characteristics according to varying the width of the low-potential voltage line SVL. FIG. 7B illustrates a current density characteristics according to varying the width of the low-potential voltage line SVL. FIG. 7C illustrates a current characteristics according to varying the width of the low-potential voltage line SVL. FIG. 7D illustrates a power density characteristics according to varying the width of the low-potential voltage line SVL.

In each graph, the sum D1+D2 of the first width D1 of the first low-potential voltage line SVL1 located in the first area CR1 adjacent to the display panel 110 and the second width D2 of the second low-potential voltage line SVL2 located in the second area CR2 far from the display panel 110 is maintained as the reference value D. In this state, signal characteristics are illustrated as a decrease in the first width D1 of the first low-potential voltage line SVL1 and an increase in the second width D2 of the second low-potential voltage line SVL2.

Here, OR represents a case that the low potential voltage line SVL with the same width of the reference value D is formed in an open structure of a stepped straight line between the power management circuit 150 and the source film SF.

Therefore, the first width D1 of the first low-potential voltage line SVL1 located in the first area CR1 adjacent to the display panel 110 and the second width D2 of the second low-potential voltage line SVL2 located in the second area CR2 far from the display panel 110 may be determined by reflecting these signal characteristics.

For example, the first width D1 of the first low-potential voltage line SVL1 located in the first area CR1 adjacent to the display panel 110 may be selected in the range of 60% to 70% for the reference value D of the low-potential voltage line SVL. In addition, the second width D2 of the second low-potential voltage line SVL2 located in the second area CR2 far from the display panel 110 may be selected in the range of 30 to 40% for the reference value D of the low-potential voltage line SVL.

For example, when the reference value D of the low-potential voltage line SVL is 10 mm, the first width D1 of the first low-potential voltage line SVL1 located in the first area CR1 adjacent to the display panel 110 may be 6.5 mm, and the second width D2 of the second low-potential voltage line SVL2 located in the second area CR2 far from the display panel 110 may be 3.5 mm.

At this time, the first low-potential voltage line SVL1 may be connected to the second low-potential voltage line SVL2 through the third low-potential voltage line SVL3 located in the third area CR3 corresponding to the left and right sides of the source printed circuit board SPCB.

The third width D3 of the third low-potential voltage line SVL3 may be equal to the reference value D of the low-potential voltage line SVL, which is the sum of the first width D1 of the first low-potential voltage line SVL1 and the second width D2 of the second low-potential voltage line SVL2. Thus, the third width D3 is greater than the first width D1 and is greater than the second width D2. For example, when the first width D1 of the first low-potential voltage line SVL1 located in the first area CR1 adjacent to the display panel 110 is 6.5 mm and the second width D2 of the second low-potential voltage line SVL2 located in second area CR2 far from the display panel 110 is 3.5 mm, the third width D3 of the third low-potential voltage line SVL3 may be 10 mm.

In this way, when the low-potential voltage line SVL transmitting the base voltage EVSS is formed in a closed loop structure, it may be in electrical contact with another driving voltage line, for example, like a high-potential voltage line DVL transmitting a high-potential subpixel driving voltage EVDD. Therefore, the source printed circuit board SPCB may have a multi-layer structure in which driving voltage lines that transmit different driving voltages are formed in different layers.

Figure 8:
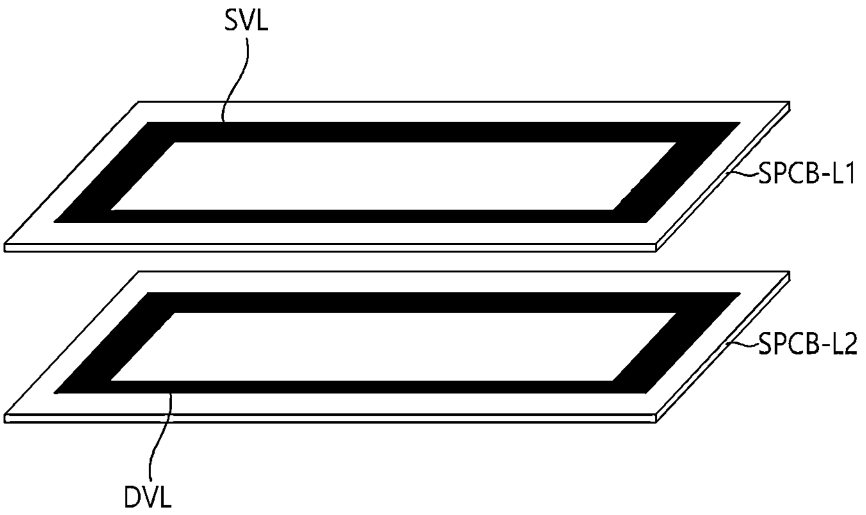
FIG. 8 is a conceptual diagram illustrating a multi-layered source printed circuit board in a display device according to embodiments of the disclosure.

FIG. 8 is a conceptual diagram illustrating a multi-layered source printed circuit board in a display device according to embodiments of the disclosure.

Referring to FIG. 8, the source printed circuit board SPCB in the display device 100 according to embodiments of the disclosure may include a first source printed circuit board layer SPCB-L1 and a second source printed circuit board layer SPCB-L2 separated by an insulating material.

The low-potential voltage line SVL with a closed loop structure may be disposed on the first source printed circuit board layer SPCB-L1.

The high-potential voltage line DVL may be disposed on the second source printed circuit board layer SPCB-L2. At this time, the high-potential voltage line DVL may have an open structure with a stepped straight line or a closed loop structure.

When the first source printed circuit board layer SPCB-L1 and the second source printed circuit board layer SPCB-L2 are formed in a multi-layer structure separated by an insulating material, the low-potential voltage line SVL of the closed loop structure formed in the first source printed circuit board layer SPCB-L1 may be electrically separated from the high-potential voltage line DVL and other voltage lines.

Figure 9A:
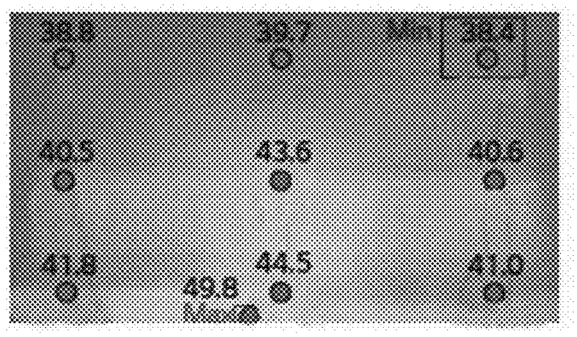
FIGS. 9A and 9B illustrate temperature diagrams measured in the display panel for cases in which a low-potential voltage line with an open structure is formed on a source printed circuit board and in which a low-potential voltage line with a closed loop structure is formed on a source printed circuit board in a display device according to embodiments of the disclosure.
Figure 9B:
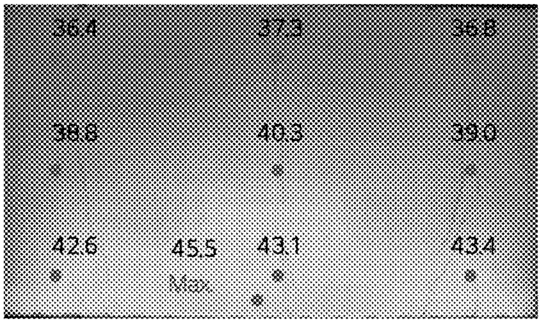

FIGS. 9A and 9B illustrate temperature diagrams measured in the display panel for cases in which a low-potential voltage line with an open structure is formed on a source printed circuit board and in which a low-potential voltage line with a closed loop structure is formed on a source printed circuit board in a display device according to embodiments of the disclosure.

Referring to FIG. 9A, when the low-potential voltage line SVL located between the power management circuit 150 and the display panel 110 is formed in a straight line (or stepped straight line) structure on the source printed circuit board SPCB, the maximum temperature for the operation of the display panel 110 increased to about 49.8 degrees.

Referring to FIG. 9B, when the low-potential voltage line SVL located between the power management circuit 150 and the display panel 110 is formed in a closed loop structure on the source printed circuit board SPCB, it was confirmed that the maximum temperature for the operation of the display panel 110 increased to about 45.5 degrees, resulting in a temperature decrease of about 4.3 degrees.

Meanwhile, the display device 100 of the disclosure may form the low-potential connection line SSVL in a dual structure extending from the low-potential voltage line SVL with the closed loop structure to the display panel 110 through the source film SF in the source film SF. In this case, the transmission characteristics and heat characteristics of the base voltage EVSS may be further improved.

Figure 10:
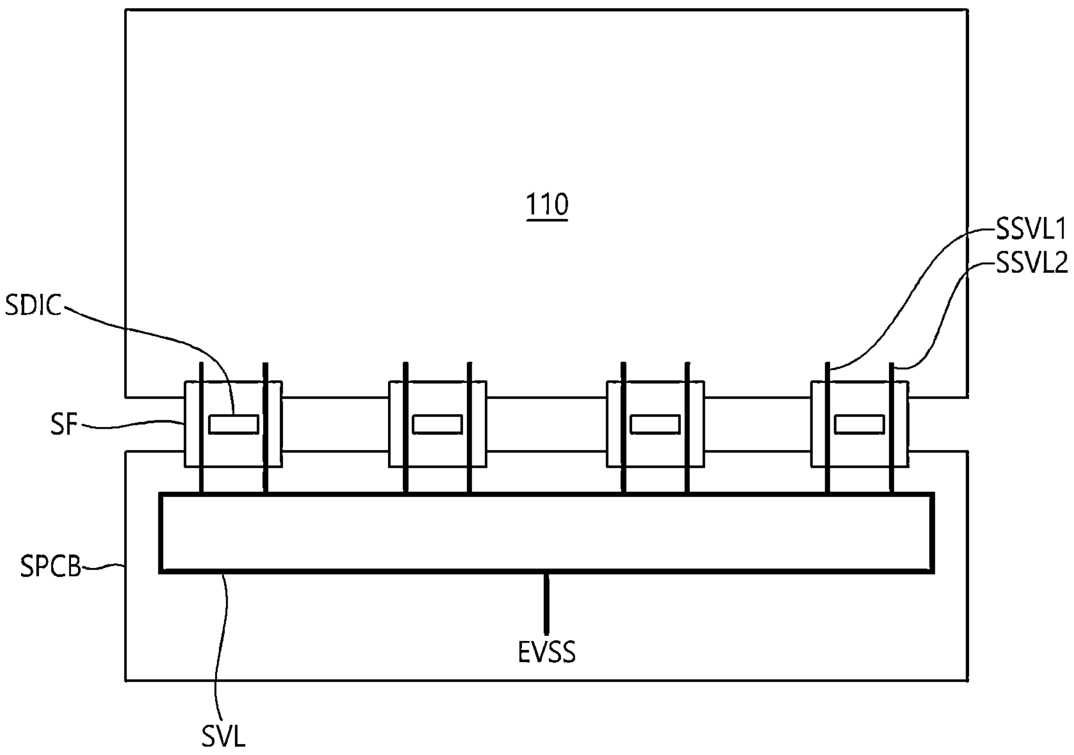
FIG. 10 is a diagram illustrating a case in which a low-potential connection line extending from a low-potential voltage line of a source printed circuit board is formed in a dual structure in a display device according to embodiments of the disclosure.

FIG. 10 is a diagram illustrating a case in which a low-potential connection line extending from a low-potential voltage line of a source printed circuit board is formed in a dual structure in a display device according to embodiments of the disclosure.

Referring to FIG. 10, one or more source driving integrated circuit SDIC included in the data driving circuit 130 in the display device 100 according to embodiments of the disclosure may be implemented on the source film SF in the form of a chip on film COF.

One side of the source film SF may be electrically connected to the display panel 110, and the other side of the source film SF may be electrically connected to the source printed circuit board SPCB.

The power management circuit 150 may supply a high-potential subpixel driving voltage EVDD and a low-potential base voltage EVSS for driving the display panel 110. Here, it illustrates only the low-potential voltage line SVL for supplying the low-potential base voltage EVSS.

At this time, the low-potential voltage line SVL transmitting the base voltage EVSS may be formed in a closed loop structure on the source printed circuit board SPCB.

In this way, when the low-potential voltage line SVL is formed in a closed loop structure on the source printed circuit board SPCB, the path of the base voltage EVSS transmitted through the low-potential voltage line SVL may increase. As a result, the temperature of the low-potential voltage line SVL may be reduced because the heat generated by the base voltage EVSS spreads over a wide area.

At this time, the low-potential connection lines SSVL may extend from a certain point of the low-potential voltage line SVL formed in a closed loop structure. The low-potential connection line SSVL may be disposed along the source film SF, specifically, formed in a dual structure along both sides of the source driving integrated circuit SDIC disposed on the source film SF, and electrically connected to the display panel 110.

That is, a first low-potential connection line SSVL1 may be disposed along the left side (e.g., a first side) of the source driving integrated circuit SDIC on the source film SF, and a second low-potential connection line SSVL2 may be disposed along the right side (e.g., a second side) of the source driving integrated circuit SDIC on the source film SF. In other words, a plurality of first low-potential connection lines SSVL1 extend from the voltage line SVL to the display panel 110 such that each first low-potential connection line SSVL1 overlaps a corresponding source film SF and is at a first side of the source driving integrated circuit SDIC that is on the corresponding source film SF. Furthermore, a plurality of second low-potential connection lines SSVL2 extend from the voltage line SVL to the display panel 110 such that each second low-potential connection line SSVL2 overlaps a corresponding source film SF and is at a second side of the source driving integrated circuit SDIC that is on the corresponding source film SF.

In this way, when the low-potential connection line SSVL is arranged in a dual structure for each source film SF, the low-potential current transmitted from the low-potential voltage line SVL with a closed loop structure formed on the source printed circuit board SPCB to the display panel 110 may be dispersed. Accordingly, the amount of heat generated by the display panel 110 is further reduced and signal characteristics are improved.

The foregoing embodiments are briefly described below.

An embodiment of present disclosure may provide a display device comprising a display panel including a plurality of subpixels, a source film coupled to a side of the display panel and on which a source driving integrated circuit supplying a data voltage to the display panel is implemented, and a source printed circuit board on which a low-potential voltage line transmitting a base voltage to the display panel through the source film is disposed in a closed loop structure.

The source printed circuit board includes a timing controller configured to supply image data to the source driving integrated circuit.

The source printed circuit board includes a power management circuit configured to generate the base voltage.

The low-potential voltage line includes a first low-potential voltage line located in a first area of the source printed circuit board, a second low-potential voltage line located in a second area of the source printed circuit board, and a third low-potential voltage line connecting the first low-potential voltage line to the second low-potential voltage line in a third area of the source printed circuit board.

The first area is an area adjacent to the display panel extending along a long axis of the display panel.

The second area is an area far from the display panel extending along a long axis of the display panel.

The third area is an area extending in a direction perpendicular to a long axis of the display panel on the left and right sides of the source printed circuit board.

A first width of the first low-potential voltage line is larger than a second width of the second low-potential voltage line.

A sum of a first width of the first low-potential voltage line and a second width of the second low-potential voltage line is a constant reference value.

The first width of the first low-potential voltage line is a range of 60 to 70% of the reference value.

The second width of the second low-potential voltage line is a range of 30 to 40% of the reference value.

A sum of a first width of the first low-potential voltage line and a second width of the second low-potential voltage line is equal to a third width of the third low-potential voltage line.

The display device further comprises a low-potential connection line extending from a certain point of the low-potential voltage line, disposed along the source film, and electrically connected to the display panel.

The low-potential connection line includes a first low-potential connection line disposed along one side of the source driving integrated circuit, and a second low-potential connection line disposed along the other side of the source driving integrated circuit.

The source printed circuit board includes a first source printed circuit board layer on which the low-potential voltage line is disposed, and a second source printed circuit board layer separated from the first source printed circuit board layer by an insulating material and on which a high potential voltage line is disposed.

The high-potential voltage line is disposed in a closed loop structure.

A display device may comprise a display panel including a plurality of subpixels; a plurality of source films each having a first side and a second side, the first side of each of the plurality of source films connected to the display panel; a plurality of source driving integrated circuits that are configured to supply data voltages to the display panel, each source driving integrated circuit on a corresponding one of the plurality of source films; a source printed circuit board connected to the second side of each of the plurality of source films; and a voltage line on the source printed circuit board that supplies a voltage to the display panel, the voltage line including a first voltage line having a first end and a second end, a second voltage line that is farther from the display panel than the first voltage line and having a first end and a second end, and a third voltage line connected to the first end of the first voltage line and the first end of the second voltage line, and a fourth voltage line connected to the second end of the first voltage line and the second end of the second voltage line.

The display device may further comprise a plurality of connection lines that extend from the voltage line to the display panel such that each connection line overlaps a corresponding source film from the plurality of source films without overlapping a source driving integrated circuit from the plurality of source driving integrated circuits that is on the corresponding source film, wherein each of the plurality of connection lines is electrically connected to the display panel.

The display device may further comprise a plurality of first connection lines that extend from the voltage line to the display panel such that each first connection line overlaps a corresponding source film and is at a first side of a source driving integrated circuit from the plurality of source driving integrated circuits that is on the corresponding source film; and a plurality of second connection lines that extend from the voltage line to the display panel such that each second connection line overlaps a corresponding source film and is at a second side of the source driving integrated circuit that is on the corresponding source film, wherein each of the plurality of first connection lines and each of the plurality of second connection lines is electrically connected to the display panel.

A width of the first voltage line may be greater than a width of the second voltage line and a width of the third voltage line and a width of the fourth voltage line are each greater than the width of the first voltage line.

The width of the third voltage line and the width of the fourth voltage line may be a same.

A sum of the width of the first voltage line and the width of the second voltage line may equal the width of the third voltage line and equals the width of the fourth voltage line.

The voltage may be one of a ground voltage or a high potential voltage that is greater than the ground voltage. The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A display device, comprising:
a display panel including a plurality of subpixels;
a source film connected to a side of the display panel;
a source driving integrated circuit on the source film, the source driving integrated circuit configured to supply a data voltage to the display panel; and
a source printed circuit board connected to the source film, wherein the source printed circuit board includes:
a first source printed circuit board layer including a low-potential voltage line that has a closed loop structure in a plan view of the display device and supplies a base voltage to the display panel through the source film,
a second source printed circuit board layer including a high-potential voltage line in the plan view of the display device, the high-potential voltage line transmitting a high potential voltage that is greater than the base voltage, and
an insulating material between the first source printed circuit board layer and the second source printed circuit board layer.

2. The display device of claim 1, wherein the source printed circuit board includes a timing controller configured to supply image data to the source driving integrated circuit and the source driving integrated circuit generates the data voltage based on the image data.

3. The display device of claim 1, wherein the source printed circuit board includes a power management circuit that is configured to supply the base voltage.

4. The display device of claim 1, wherein the low-potential voltage line includes:
a first low-potential voltage line located in a first area of the source printed circuit board;
a second low-potential voltage line located in a second area of the source printed circuit board that is spaced apart from the first area; and
a pair of third low-potential voltage lines that connect the first low-potential voltage line to the second low-potential voltage line in a third area of the source printed circuit board.

5. The display device of claim 4, wherein the first area is adjacent to the display panel and extends in a direction along a long axis of the display panel.

6. The display device of claim 5, wherein the second area is farther from the display panel than the first area and extends in the direction along the long axis of the display panel.

7. The display device of claim 6, wherein the third area is an area extending in a direction that intersects the long axis of the display panel on a left side and a right side of the source printed circuit board.

8. The display device of claim 4, wherein a first width of the first low-potential voltage line is greater than a second width of the second low-potential voltage line.

9. The display device of claim 4, wherein a sum of a first width of the first low-potential voltage line and a second width of the second low-potential voltage line is equal to a predetermined reference value.

10. The display device of claim 9, wherein the first width of the first low-potential voltage line is a range of 60% to 70% of the predetermined reference value.

11. The display device of claim 9, wherein the second width of the second low-potential voltage line is a range of 30% to 40% of the predetermined reference value.

12. The display device of claim 4, wherein a sum of a first width of the first low-potential voltage line and a second width of the second low-potential voltage line is equal to a third width of each third low-potential voltage line from the pair.

13. The display device of claim 1, further comprising:
a low-potential connection line extending from the low-potential voltage line and overlapping the source film in the plan view, the low-potential connection line electrically connected to the display panel.

14. The display device of claim 13, wherein the low-potential connection line includes:
a first low-potential connection line at a first side of the source driving integrated circuit; and
a second low-potential connection line at a second side of the source driving integrated circuit.

15. The display device of claim 1, wherein the high-potential voltage line has a closed loop structure in the plan view.

* * * * *